3,487,155
SUBSTITUTED ESTRADIOL ALKYL ETHERS
Eugene E. Galantay, Morristown, N.J., assignor to
Sandoz, Inc., Hanover, N.J.
No Drawing. Filed Feb. 19, 1968, Ser. No. 706,649
Int. Cl. A61k *17/06;* C07c *169/08*
U.S. Cl. 424—238                                    4 Claims

ABSTRACT OF THE DISCLOSURE

The compounds are substituted estradiol alkyl ethers. They are prepared by treating a suitable estrone alkyl ether, with an organo lithium compound and hydrolyzing the reaction product to obtain the corresponding substituted alkyl ether. The compounds have estrogenic/progestational activity.

---

This invention relates to estradiol derivatives and more particularly to 3-methoxy-17α-propynylestra - 1,3,5(10)-trien-17β-ol and to the preparation thereof, as well as intermediates in the preparation thereof.

The compounds are of the general structural formula

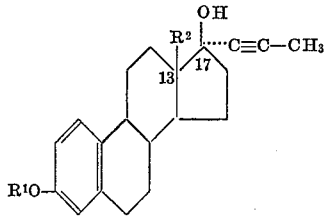

wherein $R^1$ is lower alkyl having 1 to 4 carbon atoms or cycloalkyl preferably having 5 to 6 carbon atoms e.g. cyclopentyl and cyclohexyl; and $R^2$ is lower alkyl having 1 to 3 carbon atoms.

The preferred compound of this invention is 3-methoxy-17α-propynylestra-1,3,5(10)-trien-17β-ol.

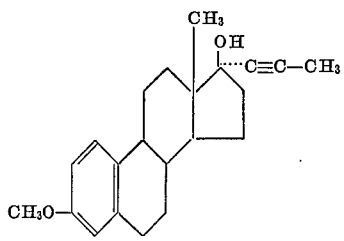

The process for preparing the compounds of Formula I may be represented by the following reaction scheme:

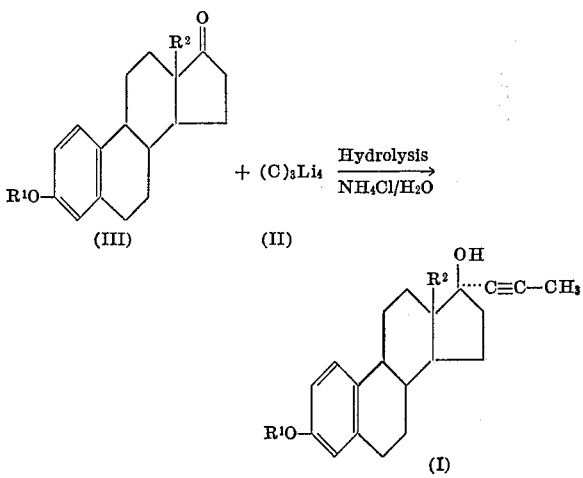

Compounds (I) are prepared by treating a corresponding estrone alkyl ether (III) wherein $R^1$ and $R^2$ have the above stated significance, with the organo lithium compound (II) in a solvent, and subjecting the reaction mixture to hydrolysis, preferably with aqueous ammonium chloride. The solvent may be an aliphatic hydrocarbon such as pentane, hexane, heptane and the like. The reaction may be carried out at a temperature of −5 to 60° C. and preferably at a temperature of 10 to 30° C.

The compound (II) may be prepared by treating n-butyllithium (IV) with propyne (VI). The reaction may be conveniently carried out in a solvent under reflux. The solvent may be an aliphatic hydrocarbon such as pentane, hexane or heptane and the like. The reaction time may be from 12 to 48 hours.

When the starting material of Formula III is estrone methyl ether

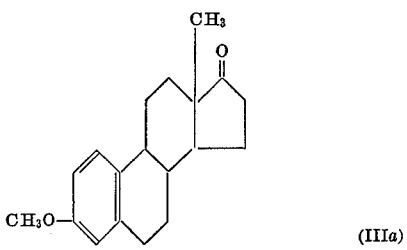

3- methoxy-17α-propynylestra-1,3,5(10)-trien-17β-ol (Ia) is obtained. Conventional recovering techniques are utilized for obtaining the product (Ia).

Certain of the compounds of Formula III are known and are prepared by methods disclosed in the literature. Those compounds of Formula III not specifically disclosed are prepared according to analogous methods from known materials.

The estradiol derivatives represented by Formulas I and Ia above are useful because they possess pharmacological properties in animals. In particular, such compounds are useful as ovulation inhibiting agents in mammals, such as higher primates, as indicated by their estrogenic activity as determined in the mouse and rat by the method basically described in Endocrinology 65 (1959), 265 and Am. J. Physiol. 189 (1957) 355 respectively.

Progestational activity is indicated by decidual cell responses in the rabbit given 4 mg. of active agent and tested by the method basically as described by Elton et al.—Experientia, Vol. XXII (1966).

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 1 milligram to 10 milligrams. This daily dosage is preferably given in equally divided doses, e.g. 1 to 2 times a day, or in sustained release form. It will be appreciated by those skilled in the art, that the daily dosage level is independent of body weight. Dosage forms suitable for internal administration comprise from about 0.5 milligram to about 10 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
|---|---|
| 3-methoxy-17α-propynylestra - 1,3,5(10) - trien-17β-ol | 2.5 |
| Tragacanth | .2 |
| Lactose | 87 |
| Corn starch | 5 |
| Talcum | 3 |
| Magnesium stearate | 0.5 |

This invention is illustrated but not limited by the following example.

EXAMPLE 3-methoxy-17α-propynylestra-1,3,5(10)-trien-17β-ol.

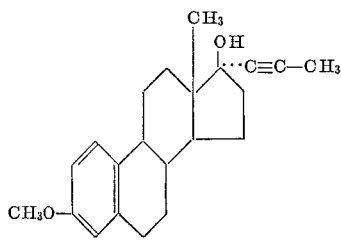

Step I

An organo lithium reagent (C₃Li₄) (II) was prepared by adding 10.9 gms. of propyne to 500 ml. of an 0.8 m. hexane solution of n-butyllithium and refluxing for 24 hours.

Step II

To the organo lithium reagent (C₃Li₄) thus prepared, 30 gms. of estrone methyl ether (IIIa) was added as a solid and the mixture stirred at room temperature for 2 hours. 300 ml. of a concentrated aqueous ammonium chloride was added with cooling. The organic phase was separated and the aqueous phase extracted 3 times with 100 ml. of ether. The ether layers were washed with water, dried over sodium sulfate and evaporated to give an oily residue. The 3-methoxy-17α-propynylestra-1,3,5(10)-trien-17β-ol was obtained by crystallization from methanol (M.P. 184–187° C.); [(α)$_D$=+5–6°, (c.=1, CHCl₃)].

What is claimed is:

1. A compound of the formula

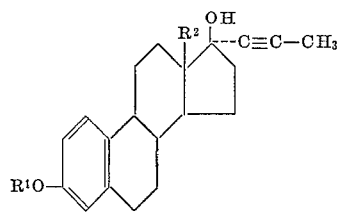

wherein R¹ is straight chain lower alkyl having 1 to 3 carbon atoms and R² is methyl.

2. The compound of claim 1 which is 3-methoxy-17α-propynylestra-1,3,5(10)-trien-17β-ol.

3. A pharmaceutical composition comprising as an active ingredient thereof a compound of the formula:

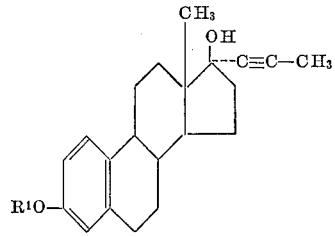

wherein R¹ is straight chain lower alkyl having 1 to 3 carbon atoms, and a pharmaceutically acceptable carrier therefor, said compound being present in said composition in an amount sufficient to provide a daily dosage of from 1 milligram to about 10 milligrams of said compound.

4. A method for treating ovarian deficiency and fertility control, which comprises administering an effective amount of a compound of the formula:

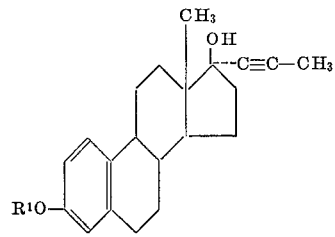

wherein R¹ is straight chain lower alkyl having 1 to 3 carbon atoms.

References Cited

UNITED STATES PATENTS 3,231,567   1/1966   Ercoli, et al.
3,256,273   6/1966   Cross.

HENRY A. FRENCH, Primary Examiner

U.S. Cl. X.R.
260—397.5